United States Patent [19]

Pechersky

[11] Patent Number: 5,432,595
[45] Date of Patent: Jul. 11, 1995

[54] METHOD FOR MEASURING RESIDUAL STRESSES IN MATERIALS BY PLASTICALLY DEFORMING THE MATERIAL AND INTERFERENCE PATTERN COMPARISON

[76] Inventor: Martin J. Pechersky, 241 Chardonnat La., Aiken, S.C. 29803

[21] Appl. No.: 90,271

[22] Filed: Jul. 13, 1993

[51] Int. Cl.⁶ .............................................. G01B 9/02
[52] U.S. Cl. ................... 356/35.5; 356/357; 356/432; 73/800
[58] Field of Search ...................... 356/35.5, 345, 347, 356/348, 357, 358, 432 T; 73/800

[56] References Cited

U.S. PATENT DOCUMENTS

| | | |
|---|---|---|
| 4,139,302 | 2/1979 | Hung et al. . |
| 4,248,094 | 2/1981 | Thompson et al. . |
| 4,249,423 | 2/1981 | Viertl et al. . |
| 4,522,510 | 6/1985 | Rosencwaig et al. .......... 356/432 T |
| 4,722,600 | 2/1988 | Chiang . |

5,166,742  11/1992  Kobayashi et al. .

OTHER PUBLICATIONS

"Measurement of Strains at High Temperatures by Means of Electro-Optics Holography", Sciammarella, et al, Jun. 1991.

Primary Examiner—Samuel A. Turner
Attorney, Agent, or Firm—Brian R. Tumm; Harold M. Dixon; William R. Moser

[57] ABSTRACT

A method for measuring residual stress in a material comprising the steps of establishing a speckle pattern on the surface with a first laser then heating a portion of that pattern with an infrared laser until the surface plastically deforms. Comparing the speckle patterns before and after deformation by subtracting one pattern from the other will produce a fringe pattern that serves as a visual and quantitative indication of the degree to which the plasticized surface responded to the stress dung heating and enables calculation of the stress.

19 Claims, 2 Drawing Sheets

_Fig 1_
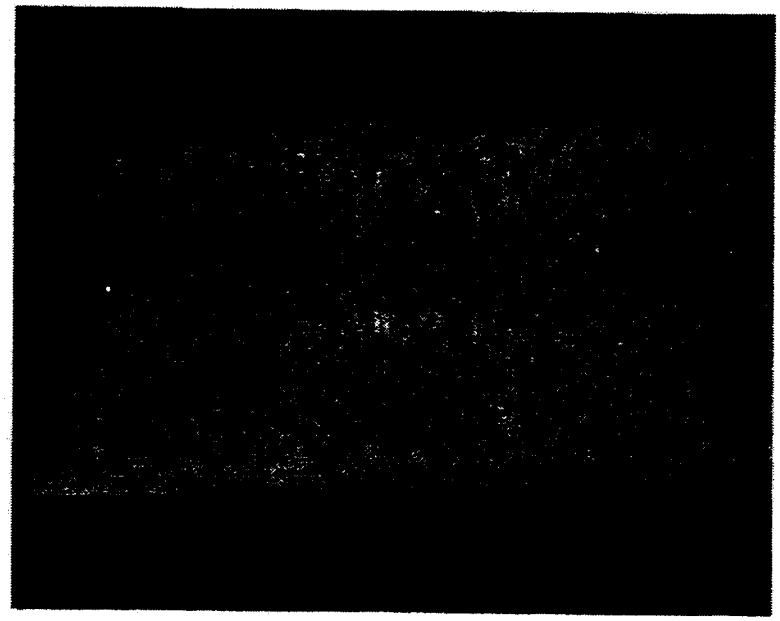
_Fig 2_
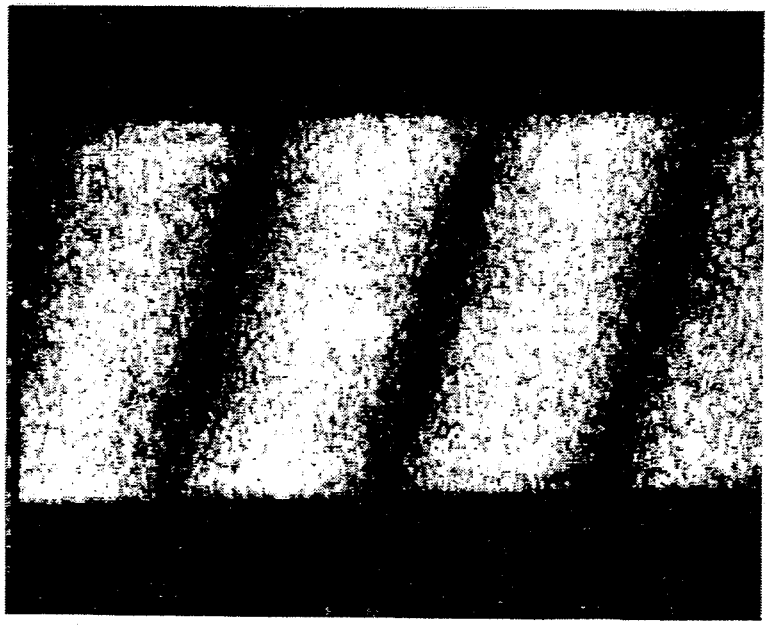

METHOD FOR MEASURING RESIDUAL STRESSES IN MATERIALS BY PLASTICALLY DEFORMING THE MATERIAL AND INTERFERENCE PATTERN COMPARISON

BACKGROUND OF THE INVENTION

1. Field of the Invention

The present invention relates to measuring stress in materials. In particular, the present invention is a method for measuring residual stress in a variety of materials including metals using laser interferometry. The United States Government has rights in this invention pursuant to Contract No. DE-AC09-89SR18035 between the U.S. Department of Energy and Westinghouse Savannah River Company.

2. Discussion of Background

Materials used in construction that are made of metals and metal alloys are prone to a phenomenon known as stress corrosion cracking. In this phenomenon, cracks appear in areas of tensile stress, such as welded joints, as a result of the migration of chloride atoms to grain boundaries in the material. Tensile stresses are induced in manufacturing operations such as bending, heat treating, grinding and welding. The presence of stress in the material is one factor in the cause of stress corrosion cracking, but other factors are also important. Two additional factors are the specific metallurgical makeup of the material and the environment of use.

Residual stresses add to the load applied to a part used in construction. If the structural design is not sufficiently conservative, the part can fail from the combination of the load and material stresses. By having a method for accurately measuring the residual stresses in individual parts, a designer can have a better understanding of the total loads on them. With that understanding, the designer can predict failure with greater certainty and design to avoid failure or to relieve the stresses.

Stress measurement at the surface of a metal object is especially important because most failures begin them. Surface stress will result in crocks that propagate more rapidly, that tend to pull the material apart. Welding in particular imparts surface stresses because it imposes sharp temperature gradients between the exterior and the interior regions of a material, resulting in plastic deformation of the exterior and elastic deformation of the interior of the material.

Residual stresses are currently measured in a number of different ways. For example, strain gages are used to measure stress just after a specimen is removed from the material by drilling. But drilling imparts its own stresses. Moreover, stresses tend to concentrate at holes including drilled holes. Alternatively, chemical etching can be substituted for drilling, but not all materials can be etched and etching is slow. Furthermore, both etching and drilling are destructive methods of measuring stress.

There are of course nondestructive stress measuring techniques. For example, in the case of untextured, single-phase materials under uniaxial loads, acoustic techniques have proved successful. For magnetic alloys, where the stresses do not exceed 70,000 pounds per square inch, magnetic techniques are applied. If the material is crystalline, X-ray diffraction techniques are often used. But the equipment needed is cumbersome and the depth of the stresses measurable with X-ray diffraction is very shallow, not more than approximately 20 micrometers in most metals.

Optical methods for measuring strain are known; see Chiang's description in U.S. Pat. No. 4,722,600. Laser interferometry is also known in measuring deformation. Kobayashi et al describe interferometry using helium-neon lasers in their patented optical deformation measuring apparatus, in U.S. Pat. No. 5,166,742. In their specification, they disclose that deformation, in particular "movement," of an object can be analyzed by comparison of speckle patterns produced by the object before and after movement. The analysis of speckle patterns is accomplished by Fourier transforms of the patterns.

Using lasers to anneal a small portion of a surface in the measurement of residual stress is also known. Both Viertl et al, in U.S. Pat. No. 4,249,423, and Thompson et al, in U.S. Pat. No. 4,248,094, disclose a method for measuring stress dynamically using strain gages in combination with heat deposition by lasers. The heat causes local melting to produce stress relief.

Hung et al (U.S. Pat. No. 4,139,302) disclose a method and apparatus for analyzing stress-induced deformations using interferometry. Their method involves preparation of an interferogram using coherent light directed toward an object to which stress has been applied, and then processing the interferogram through a fringe-frequency discriminatory filter to make the fringes visible to the eye.

However, nothing in these patents or methods teaches a method for measuring residual stress in an object by the combination of laser interferometry and laser annealing.

SUMMARY OF THE INVENTION

According to its major aspects, here briefly described, the present invention is a method for measuring residual stress using a combination of laser speckle interferometry and laser annealing. This method finds a particular use in the determination of residual stresses in welds in piping but has broad applicability in measuring stresses in any metal or metal alloy used in any construction, including aircraft and bridges, and in other, plastically-deformable materials as well.

According to the method, two beams of light from a single, low-power laser (such as a helium-neon laser) are directed on the portion of the surface of the material of interest. The beams of laser light interfere to create a first interference pattern ("speckle pattern") that is recorded and stored on a programmed, general purpose computer. Then a high-powered laser is directed at a small portion of the speckle pattern to cause the material to deform plastically. After the material cools, a second speckle pattern appears and is recorded and stored on the same computer. The bit values of one of the speckle patterns are subtracted from the values of the other to produce a "fringe pattern." The number of fringes in the fringe pattern is a quantitative and visual indication of the residual stress at that location, because it indicates the change in the surface produced when the material is allowed to move in response to the stress.

A major feature of the present invention is the one-two combination of laser interferometry and laser annealing to produce a visual indication of the residual stress, an indication that can be perceived, analyzed and quantified.

Another important feature of the present invention is the use of lasers in particular to create the conditions that enable the measurement of an indicator of residual stress. Lasers can be positioned remotely, and focused precisely and quickly. Only small areas need be affected and the measurement process is nondestructive. Furthermore, lasers can be very small. Therefore, the equipment needed to perform the measurements is compact and fits into small diameter piping or other restricted space.

Other features and their advantages will be readily apparent to those skilled in the art of stress measurement following a careful reading of the Detailed Description of Preferred Embodiments of the present invention accompanied by the following drawings.

BRIEF DESCRIPTION OF THE DRAWINGS

In the drawings:

FIG. 1 is an example of a speckle pattern;

FIG. 2 is an example of a fringe pattern produced by a computer from two sequential speckle patterns;

DETAILED DESCRIPTION OF PREFERRED EMBODIMENTS

The present invention is a method for measuring stress in a material. The stress may be either residual or applied stress or a combination of both, although measuring residual stress is a particular concern of the present invention. "Measuring" means making a quantitative assessment of a physical characteristic of the material - - - in particular a fringe pattern - - - that correlates with stress and is made manifest in the steps of the present method, and then calculating the stress based on that assessment.

This method can be applied to many different materials. Certainly metals and metal alloys lend themselves well to this method and stress measurement in welded piping, aircraft bodies, and so on, is of particular importance. However, many plastics and glasses can also be the subject of the method if they deform plastically. Many objects deform elastically up to a point when, with the application of further stress, they deform plastically; that is, when a sufficient load is applied to an object and then removed, the final shape of the object will be different than the preloaded shape.

Figure 3:
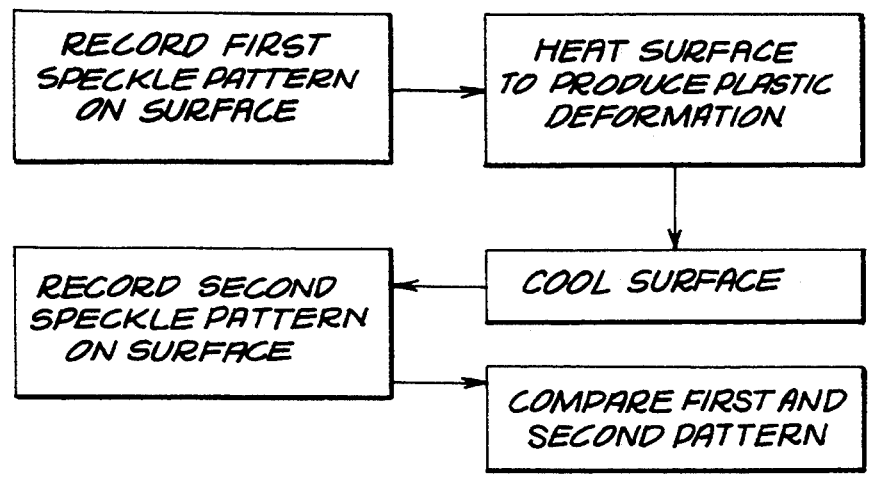
FIG. 3 is a flow chart illustrating the method according to the present invention.

The method, illustrated in FIG. 3, involves the use of two lasers: a first laser for establishing an interference pattern or "speckle pattern" on the object, and a second laser to heat the object. The first laser is used to establish a first speckle pattern on the object before the stress is applied and then a second speckle pattern after the stress is relieved. The two patterns are recorded and stored for comparison by a computer technique called subtraction, where the bit values at each location of one speckle pattern are subtracted from the bit values at the corresponding locations of the other pattern. The result of the comparison is a "fringe pattern" that correlates to the stress present in the object and from which the amount of stress can be mathematically derived.

The first laser should be a "low power" laser; that is, it should simply illuminate the surface of the object in establishing the speckle pattern. The laser will then need to be sufficiently bright to illuminate the object from the distance the light must travel to and from the object. Preferably, the laser will be a helium-neon laser to meet the requisite brightness and spectrum of light.

The speckle patterns are established by the well known techniques of interferometry. In particular, a speckle pattern is produced when a laser beam is divided to form two beams of light, and the two beams are directed to the same, diffusely reflecting surface. The beams randomly interfere, to produce a grainy, speckly appearance that, on close inspection, comprises tiny regions of light and dark areas where the beams interfere constructively and destructively, respectively. FIG. 1 illustrates a typical speckle pattern of a specimen of Type 18-8 stainless steel under 48,621 lb/in$^2$ (about 3,418 kg/cm$^2$) tension. The light reflected by the surface, the first speckle pattern, is recorded and stored by a programmed, general or special purpose computer.

The second laser must be of higher power output than the first and is preferably an infrared laser capable of depositing sufficient heat on the same portion of the object's surface where the first laser was directed. Sufficient heat must be applied to produce slight plastic deformation, rather than melting, of the surface. The requisite laser intensity at the surface can be determined experimentally or by consulting a standard reference such as a metals handbook to determine the melting and plastic deformation temperatures of the material and then adjusting the output of the second laser accordingly.

Upon application of light from the second laser, the speckle pattern will change as the material deforms plastically to relieve the stress in the surface material of the object. Then this second speckle pattern is recorded by and stored in the computer. The visual differences between the first and second speckle patterns are related to the residual stress in the material. The two patterns are compared by subtracting the first from the second, or, equivalently, the second from the first. "Subtracting" is a technique common in computer comparisons and simply refers to the technique of subtracting the bit values assigned to represent the relative brightness of each location of one of the patterns from the brightness bit values assigned to the corresponding locations of the other pattern. The result will be a fringe pattern.

The second laser is directed onto the object's surface for a short period of time ranging from at least approximately one microsecond to a few seconds, depending on the nature of the material and the amount of stress believed to be present. However, shorter or longer heating periods may be used if appropriate to produce slight plastic deformation. In practice, light from the second laser is applied, then the second speckle pattern obtained and compared to the first. If there is no change from the first speckle pattern, and, hence, no fringe pattern, then the intensity or duration of the light from the second laser can be increased slightly and the surface reheated until there is a pattern change.

A fringe pattern for the specimen of FIG. 1 is illustrated in FIG. 2. Here, the tension is reduced by 3,265 lb/in$^2$ (about 230 kg/cm$^2$) to 45,356 lb/in$^2$ (about 3,188 kg/cm$^2$). A fringe pattern is a series of light and dark bands that are related to the stretching or unstretching of the surface. Because the surface has deformed in response to the stress, and because the deformation is in response to the relief from stress, the fringe pattern is a visual indication or manifestation of the residual stress and can be related quantitatively to the stress in the material.

Stress produces the movement of mass that causes this deformation. If the following are known: (1) temperature profile of the surface during the time the second laser was applied; (2) the length of time the second laser is applied; (3) direction and extent of mass movement; and (4) the characteristics of the material of which the object is made, then the residual stress, $\sigma$, can be calculated.

For example, in the case of a uniformly applied uniaxial stress with uniform heating this calculation can be performed with the following equation:

$$\sigma = ((E_L/2) \cdot \epsilon_a{}^2 - \sigma_Y{}^2/E_H - \sigma_Y \cdot \alpha \cdot \Delta T) \div (\epsilon_a - \sigma_Y/E_L),$$

where $\epsilon_a = \lambda \div (2 \cdot \Delta x \cdot \sin(\theta))$, and where $\sigma$ = the value of the tensile or compressive stress being measured, $E_L$ = the value of Young's Modulus prior to laser heating, $\epsilon_a$ = the in-plane strain resulting from the stress relaxation, $\sigma_Y$ = the yield stress at the elevated temperature, $E_H$ = the value of Young's Modulus at the elevated temperature, $\alpha$ = the coefficient of thermal expansion of the material averaged over the range of temperatures expected, $\Delta T$ = the temperature rise due to the laser heating, $\lambda$ = the wavelength of the laser light for the speckle interferometer, $\Delta x$ = the measured fringe spacing after performing the image subtraction, and $\theta$ = the angle of incidence of the interferometer laser beams.

The type of speckle interferometer used for these measurements is sensitive to the in-plane strain (i.e., the stretching of the surface) of the object. This type of interferometer is insensitive to changes in the elevation or distance of the surface relative to the interferometer optics, unlike holographic methods in which there is always some sensitivity to the out-of-plane deformations. Moreover, out-of-plane deformations are a second order effect and therefore are not as reliable as in-plane strain measurements.

Figure 4:
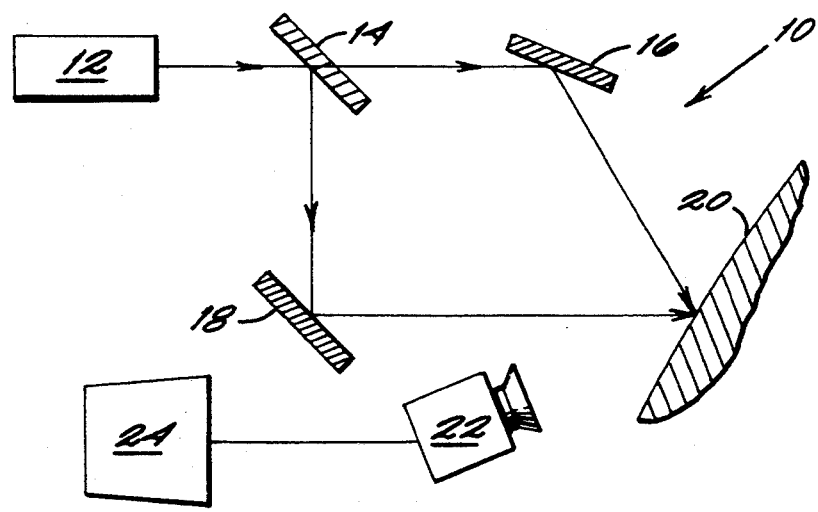
FIG. 4 is a schematic diagram of an apparatus for laser interferometry, for practice of the method of FIG. 3.
Figure 5:
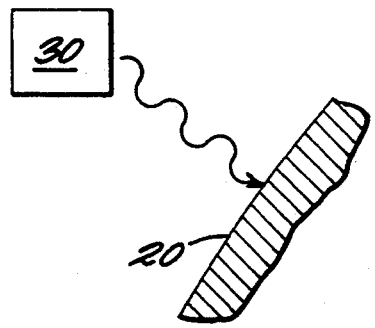
FIG. 5 is a schematic diagram of an apparatus for heating a surface, for practice of the method of FIG. 3.

Suitable apparatus for carrying out the method according to the present invention is illustrated schematically in FIGS. 4 and 5. An apparatus 10 for laser interferometry includes a laser 12, a beam splitter 14, and reflectors 16, 18. A beam of light from laser 12 is divided by beam splitter 14 to form two beams, which are directed to a surface 20 of an object by reflectors 16, 18. At surface 20, the beams interfere randomly to produce a speckle pattern such as that shown in FIG. 1. The speckle pattern is detected and recorded by a recorder 22, and stored by a computer 24. To implement the method, a first speckle pattern of surface 20 is produced and recorded using apparatus 10, then, a second laser 30 (preferably an infrared laser) heats a portion of the surface sufficiently to produce plastic deformation. A second speckle pattern is recorded, and the differences between the two patterns are compared using computer 24. The second pattern is subtracted from the first (or vice versa) to produce a fringe pattern (see FIG. 2) that is a visual indication of the residual stress in the object.

It will be apparent to those skilled in the art that many changes and modifications can be made to the foregoing description of preferred embodiments without departing from the spirit and scope of the invention, as defined by the appended claims.

What is claimed is:

1. A method for producing a visual indication of stress in a surface of a material, said method comprising the steps of:

dividing light from a first laser into two beams;

directing said two beams onto said surface to establish a first light interference pattern;

recording said first interference pattern;

heating a portion of said surface sufficiently to deform said plastically;

directing said two beams of light onto said portion to establish a second interference pattern on said portion;

recording said second interference pattern; and comparing said first and said second interference patterns to determine visual differences between said first and said second interference patterns as a result of said deformation.

2. The method as recited in claim 1, wherein said heating step further comprises the step of directing light from a second laser onto said first interference pattern.

3. The method as recited in claim 1, wherein said heating step further comprises the step of directing light from a second laser onto said first interference pattern, said second laser emitting infrared light.

4. The method as recited in claim 1, wherein said heating step further comprises the step of directing light from a second laser onto said first interference pattern, said second laser emitting infrared light at an intensity sufficient to deform said surface plastically.

5. The method as recited in claim 1, wherein said heating step further comprises the step of directing light from a second laser onto said first interference pattern long enough to deform said surface plastically.

6. The method as recited in claim 1, wherein said first and second interference patterns are stored on a computer in the form of binary bit values, and wherein said comparing step further comprises the step of subtracting bit values representing said first interference pattern from bit values representing said second interference pattern.

7. The method as recited in claim 1, further comprising the step of dividing light from a helium-neon laser into said two beams.

8. The method as recited in claim 1, further comprising the step of allowing said portion to cool before establishing said second interference pattern.

9. A method for producing a visual indication of stress in a surface of a material, said method comprising the steps of:

directing two beams of light from a single laser onto said surface to establish a first light interference pattern;

recording said first interference pattern in the form of binary bit values;

directing light from an infrared laser onto a portion of said surface to heat said portion whereby said portion will deform plastically in response to said stress;

directing said two beams of light onto said portion to establish a second interference pattern on said portion;

recording said second interference pattern in the form of binary bit values; and subtracting bit values of said first interference pattern from bit values of said second interference pattern whereby said difference in bit values results in a fringe pattern indicative of said stress.

10. The method as recited in claim 9, wherein said surface is heated sufficiently to deform plastically.

11. The method as recited in claim 9, further comprising the step of dividing light from said first laser into said two beams.

12. The method as recited in claim 9, further comprising the step of dividing light from a helium-neon laser into said two beams.

13. The method as recited in claim 9, further comprising the step of allowing said portion to cool before establishing said second interference pattern.

14. A method for measuring stress in a surface of an object, said method comprising the steps of:

dividing light from a first laser into two beams;

directing said two beams onto said surface to produce a first interference pattern;

recording said first interference pattern in the form of binary bit values;

directing light from a second laser on said surface to heat said surface, second laser being an infrared laser;

directing said two beams onto said surface to produce a second interference pattern;

recording said second interference pattern in the form of binary bit values;

subtracting bit values of said first interference pattern from bit values of said second interference pattern to produce a fringe pattern indicative of said stress in said surface; and calculating said stress from said fringe pattern.

15. The method as recited in claim 14, wherein said surface is heated sufficiently to deform plastically.

16. The method as recited in claim 14, further comprising the steps of:

increasing power of said infrared laser if said surface has not deformed as a result of heating; and re-heating said surface with said infrared laser to deform said surface.

17. The method as recited in claim 14, wherein said surface is heated sufficiently to deform plastically and further comprising the steps of:

increasing power of said infrared laser if said surface has not deformed as a result of heating; and re-heating said surface for at least one microsecond with said infrared laser to deform said surface plastically.

18. The method as recited in claim 14, further comprising the step of dividing light from a helium-neon laser into said two beams.

19. The method as recited in claim 14, further comprising the step of allowing said surface to cool before producing said second interference pattern.

* * * * *